March 10, 1964 M. N. MURRAY 3,124,727
CAPACITOR WITH AT LEAST ONE ELECTRODE IN A SEALED CONTAINER
Filed Oct. 23, 1959
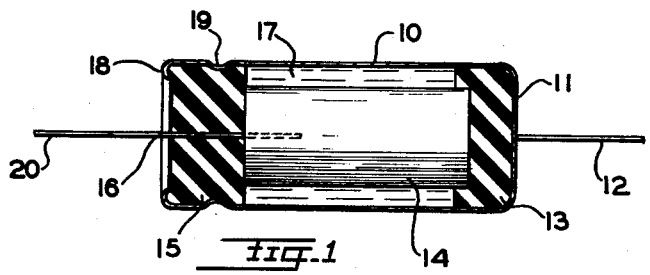
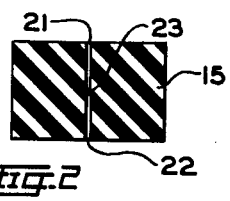
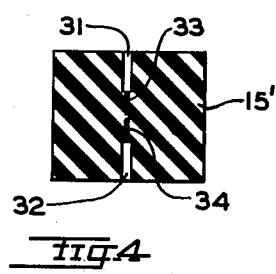
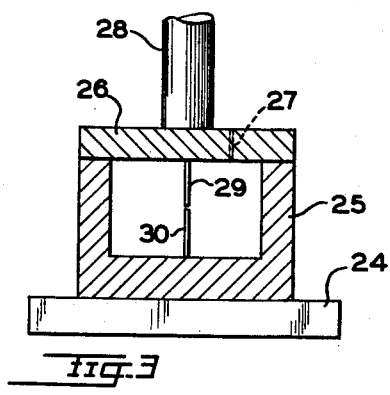
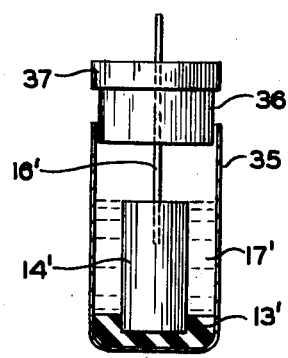
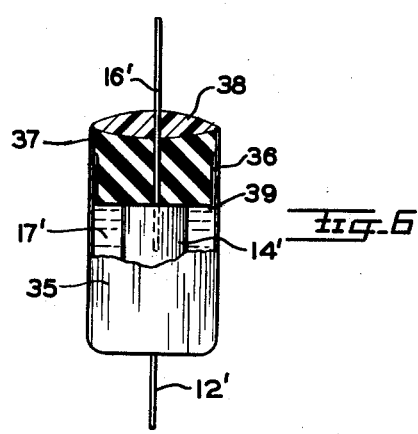
INVENTOR.
MYLES N. MURRAY
BY
Oberlin, Maky & Donnelly
ATTORNEYS

United States Patent Office 3,124,727
Patented Mar. 10, 1964

3,124,727
CAPACITOR WITH AT LEAST ONE ELECTRODE IN A SEALED CONTAINER
Myles N. Murray, Lyndhurst, Ohio, assignor to Industrial Electronic Rubber Company, Solon, Ohio, a corporation of Ohio
Filed Oct. 23, 1959, Ser. No. 848,434
2 Claims. (Cl. 317—230)

This invention relates to capacitors and, more particularly, to capacitors in which external connections are made to container-housed elements through plugs which serve to seal the containers.

A typical wet electrolytic capacitor, for example, comprises a metal can or container filled with an electrolyte into which an anode member is inserted. The open end of the can is sealed by a plug made of rubber or the like, and a wire connector leading from the anode member must be passed through such plug for external connection, with the plug also serving to insulate such anode connection from the can. The job of penetrating a solid rubber plug with a wire is obviously a difficult one, particularly when such elements are of very small size, and it has been proposed to pierce the plugs with a suitable tool prior to assembly in such capacitors to reduce the resistance to penetration and guide the wire. This solution of course requires an added operation to be performed, that is, in addition to the usual molding of the plug, and thus adds to the cost of the component supplied. Moreover, in plugs of smaller sizes particularly, the piercing is not always easily accomplished, with the result readily apparent to the worker assembling the capacitor.

One of the primary objects of my invention is therefore to provide an improved plug of this type having guide openings at both end faces thereof which they clearly defined and thus easily detected. Another object is to provide such a plug in which these openings are molded in the same, thereby to eliminate any need for a further forming operation prior to use of the plug, and a related object is to provide an economical method of producing such a molded product.

In fulfilling its function as a seal for the container, such an end plug must of course seal the wire or other connector extending therethrough as well as the container or can, and it is also a principal object of the present invention to provide a plug of this nature which will in use effect a superior seal of the wire or other connector penetrating the same.

It is an additional object to provide an improved form of electrolytic capacitor basically of can and plug type but with a simplified sealed relation of the two. A further object is to provide a method for manufacture of this novel capacitor.

Other objects of the invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a longitudinal sectional view of a capacitor made in accordance with the present invention;

FIG. 2 illustrates in diametrical section the end plug used in such capacitor prior to assembly therein;

FIG. 3 is a simplified showing of a mold developed for production of such new plug;

FIG. 4 illustrates in like section a slightly modified form of such plug;

FIG. 5 is a further longitudinal section of a modified form of capacitor in partially assembled state; and FIG. 6 shows the capacitor of FIG. 5 in its completed operative condition.

Referring now to the drawing in detail, the capacitor illustrated in FIG. 1 comprises a metal can or container 10 having a closed end 11 to which a first conductive connector 12 is secured, for example, by butt welding. A bushing 13 made of insulating material is fitted in the closed end of such can and a porous anode member 14 of smaller diameter than the can is positioned centrally in the latter with its inner end partially engaged in and thus seated by the bushing. In a typical assembly the can 10 will be made of silver, the connector 12 of nickel, the bushing 13 of a suitable rubber, and the anode 14 of tantalum.

The open end of the can is closed by a plug 15 through which a tantalum connector 16 fixed in the outer end portion of the anode extends, and the annular space between the anode and can is filled with an appropriate electrolyte 17, for example, sulfuric acid. The can is originally formed with a uniformly cylindrical wall, and after insertion of the bushing, anode, electrolyte and plug, the open end of the can is spun over against the outer end face of the plug as indicated at 18 and an inwardly directed bead 19 is formed in the wall section embracing the plug, whereby such plug is tightly sealed in the end of the can. A nickel wire 20 is butt welded to the end of the tantalum connector 16 to complete the external connection of the anode.

The end plug 15 used in such capacitor, shown separately in FIG. 2, is molded of an elastomeric material selected for compatability with the electrolyte to which it will be exposed, good temperature stability, absence of deterioration with age, and high dielectric strength. Examples of such materials which have been used are polybutadiene, polyisobutylene, "Kel–F" supplied by Minnesota Mining & Manufacturing Company, (chlorotrifluoroethylene and vinylidene fluoride copolymer), and the hexafluoropropylene and vinylidene fluoride copolymer supplied by E. I. du Pont de Nemours & Co. as "Viton–A" and also by Minnesota Mining & Manufacturing Company under the name "Fluorel."

This resiliently deformable plug, of right cylindrical shape as illustrated, has molded therein two small pilot holes 21 and 22 extending in alignment respectively inwardly from the end faces of the plug and being separated at their inner ends by an integral membrane 23. These holes are provided to facilitate the necessary penetration of the plug by the wire connector, and the membrane will of course be punctured in such operation. It is preferred that such membrane be located intermediate the ends of the plug, rather than at an end face, whereby a distinct opening will be clearly apparent to the worker at each end to facilitate the assembly, and the diameter of the molded-in holes will be slightly less than the diameter of the wire to be used.

The intermediate membrane 23, when punctured by the wire, provides over its axial thickness a zone of increased contact pressure with the wire and thus enhances the obviously important sealing of such wire. When assembled in the can in the manner described the plug is of course deformed to lock the same in place and provide the outer seal with the end of the can; such deformation compresses the plug about the inserted wire, with an area of increased compression occurring at the now-punctured membrane.

The provision of such integral membrane intermediate the ends of the plug also greatly facilitates the molding operation whereby the plug is formed, particularly in the production of plugs of very small size. Ordinarily, to mold such an article with a hole therethrough simply entails the use of a pin or stud in the mold cavity to define the desired passage; however, the plug length and hole diameters involved in supplying small capacitor end plugs are such that the use of a single pin in the mold cavity proved unsatisfactory. One such plug, for example, has an axial length of .140 in., and the diameter of the hole therein should be .019 in. Through pins, that is, extending from the top to the bottom of the mold cavity, suitable for dimensioning on this order are thus inherently mechanically weak, and as a result such pins are easily deformed and broken.

The new plug described herein is made in a mold illustrated in simplified form in FIG. 3, such mold comprising a support 24, a lower die member 25, and an upper die member 26, the latter having a vent 27 and a plunger 28 attached thereto to open and close the mold. The cavity of such mold is cylindrical and a first pin 29 is secured at right angles to the lower face of the upper die member, with a second pin 30 similarly secured to the upper face of the lower die member. The two such pins are accurately aligned and of such lengths as to be spaced a predetermined distance apart at their ends when the mold is closed as shown. The unvulcanized elastomer material is added to the mold, with suitable catalyst mixed therewith, and heat applied to cure the same.

It has been found that such use of two mold pins, with the spacing thereof defining the membrane in the molded article, has greatly reduced the incidence of pin replacement, as compared to the use of a single pin, the unsupported pin length being more than halved in this new arrangement for greater mechanical strength and stability.

Moreover, this technique permits the use of pins of stepped diameter when added strength is needed, for example, in making plugs of increased length. One such plug is illustrated in FIG. 4, and it will be seen that the pilot holes 31 and 32 therein have inner end sections 33 and 34 respectively of reduced diameter. The mold pins in this case are of course correspondingly formed, so that they have relatively heavy base sections for added support; such pins can obviously be readily fabricated by turning.

More specific examples of representative plugs made in accordance with the invention are as follows, with all dimensions given in inches: (a) a first plug has an outside diameter of .160 and a length of .127, with a hole diameter of .012 to receive a .020 diameter wire and the thickness of the membrane being .003–.006; (b) a second plug has an outside diameter of .189 and a length of .140, with a hole diameter of .019 and a membrane of .005; (c) a third plug is made with stepped openings as illustrated in FIG. 4, such plug having an outside diameter of .250 and a length of .190, with the membrane thickness being .010 and the large and small hole diameters respectively being .020 and .012; and (d) a fourth plug likewise having stepped openings has an outside diameter of .350 and a length of .250, with membrane .062 thick and the hole diameters being the same as given for the third plug.

In FIGS. 5 and 6, I have shown a modified form of capacitor which differs from the form first described with respect to the manner in which the end plug is sealed to the can. The assembly comprises the can 35 having a uniform cylindrical wall, which is in fact the original form of the can used in the FIG. 1 capacitor before the deformation of the same about the inserted end plug. The plug 36 here has a flanged upper end 37, but is in other respects the same as the plug previously described. Similarly, the assembly comprises a corresponding bushing 13′, a porous anode 14′, connector 16′ for the latter, liquid electrolyte 17′, and connector 12′ (FIG. 6).

The main body of the plug is of slightly smaller diameter than the open end of the can, so that clearance between the two is provided when the plug is only partially inserted as shown in FIG. 5, the flange 37 on the other hand being slightly larger than the inside diameter of the can. In this incompletely assembled condition, the unit is heated to the maximum temperature of operation for which it is designed, which will be just under the boiling point of the particular electrolyte used, until all of the components have reached their maximum volumetric expansion and the space within the upper end of the can is filled with electrolyte vapor. While at this elevated temperature, the end plug 36 is pushed into the can, deforming the upper end flange 37, and a cap of thermo-setting synthetic resin 38, for example, an epoxy resin, is applied over the slightly inwardly deformed outer end of the plug and the surrounding end of the can; such added cap is cured in place, by appropriate application of such added heat as may be necessary for the purpose.

In the insertion of the end plug, the bottom thereof is brought against the upper end of the anode, and when the device cools, the electrolyte vapor which previously filled the end of the can with some leakage thereof, condenses to leave an evacuated space 39 between the liquid level and the inner end of the plug. Such space together with the slight clearance about the wall forms a chamber which will accommodate expansion of the liquid at the maximum temperature of operation, without hydraulic pressure being exerted on the end seal.

Furthermore, the resin cap is bonded to the metal can while at the maximum operating temperature, so that the union is prestressed at temperatures therebelow. Accordingly, at this elevated temperature, the bond is without stress, and better protection against leakage is realized. It will also be clear that this type of seal eliminates the need for crimping and beading of the can, whereby the production is simplified.

The new end plug as shown and described in detail herein comprises a single set of aligned pilot holes and the integral membrane thereof is located approximately mid-way between the end faces. It will, however, be appreciated that multiple sets of pilot holes can be provided, for example, where it is desired to bring both external connectors through the same end, and also that the membrane could be closer to one end face than the other and still satisfy the preferred intermediate location of the same. As will be apparent from the specific examples given in the foregoing, the thickness of the membrane will vary, the objective here being to provide easy puncturing with significant zone of added compression for improved sealing.

It will likewise be understood by workers in the art that the new plug can be used with other types of capacitors, for example, foil wound capacitors, with the same advantages of connector sealing, ease of manufacture, and the like.

Other modes of applying the principle of the invention may be employed, change being made as regards the details described, provided the features stated in any of the following claims or the equivalent of such be employed.

I therefore particularly point out and distinctly claim as my invention:

1. In a capacitor having an electrode member housed in a container open at one end, with a conductor extending from such electrode member through such open end; means for closing the open container end and fixing the relative position of such conductor, said means comprising a plug-like body of resiliently deformable material, said body being formed with aligned openings of slightly smaller diameter than the conductor, said openings extending respectively inwardly from the end faces of said body and being separated by an internal membrane of the body material, the conductor passing in sealed relation through said openings in said body and penetrating said membrane under hand pressure, and the body being tightly fitted in the open end of the container.

2. A combination according to claim 1 wherein the portions of said openings adjacent the end faces of said body have a diameter slightly larger than the diameter of said conductor.

References Cited in the file of this patent

UNITED STATES PATENTS

| | | | |
|---|---|---|---|
| 768,175 | Fritchle | Aug. 23, | 1904 |
| 2,264,405 | Poitras | Dec. 2, | 1941 |
| 2,439,589 | Sundell | Apr. 13, | 1948 |
| 2,615,111 | Paquette et al. | Oct. 21, | 1952 |
| 2,758,258 | Bliss | Aug. 7, | 1956 |
| 2,820,088 | Sperry | Jan. 14, | 1958 |
| 2,851,642 | Schaeren | Sept. 9, | 1958 |
| 2,935,722 | Kacin | May 3, | 1960 |
| 3,058,040 | Wellington | Oct. 9, | 1962 |

FOREIGN PATENTS

| | | | |
|---|---|---|---|
| 504,748 | Great Britain | May 1, | 1939 |
| 696,241 | Great Britain | Aug. 26, | 1953 |